United States Patent [19]

Silverman

[11] Patent Number: 5,385,385

[45] Date of Patent: Jan. 31, 1995

[54] CHILD'S AUTOMOTIVE SAFETY BOOSTER SEAT WITH A VIEW

[76] Inventor: Matthew H. Silverman, 61 Hubbard St., Concord, Mass. 01742

[21] Appl. No.: 29,090

[22] Filed: Mar. 10, 1993

Related U.S. Application Data

[63] Continuation-in-part of Ser. No. 936,953, Aug. 26, 1992, abandoned.

[51] Int. Cl.⁶ .............................................. A47D 1/10
[52] U.S. Cl. ............................ 297/250.1; 297/452.27; 297/452.37
[58] Field of Search ........... 297/219.12, 250.1, 256.16, 297/254, 452.11, 452.14, 452.16, 452.27, 452.37, DIG.1, 485

[56] References Cited

U.S. PATENT DOCUMENTS

| | | | |
|---|---|---|---|
| 3,747,977 | 7/1973 | Ronland | 297/452.37 X |
| 4,522,447 | 6/1985 | snyder et al. | 297/452.27 |
| 4,759,588 | 7/1988 | Husnik | 297/200.1 X |

FOREIGN PATENT DOCUMENTS

| | | | |
|---|---|---|---|
| 489607 | 6/1992 | European Pat. Off. | 297/452.27 |
| 2595929 | 9/1987 | France | 297/250.1 |
| 2012568 | 8/1979 | United Kingdom | 297/250.1 |
| 2154131 | 9/1985 | United Kingdom | 297/250.1 |
| 2215594 | 9/1989 | United Kingdom | 297/250.1 |

Primary Examiner—Laurie K. Cranmer
Attorney, Agent, or Firm—Salzman & Levy

[57] ABSTRACT

The present device features a child's automotive safety booster seat that has enough rigidity to withstand high compression, and, at the same time, is soft and comfortable for the child occupant. Conflicting safety design objectives are accomplished by constructing the center of the booster seat from a rigid styrofoam, which is overlaid with a thin layer of soft urethane foam for comfort. The soft urethane foam also serves to provide a flexible intersection allowing the child seat to bend and conform with almost any angle of backseat currently provided by automobile manufacturers. This flexibility about the intersection does away with any need for a mechanical hinge to provide for the angle adjustment. Added strips of batten can be added to the rigid styrofoam to provide further stiffness and support.

7 Claims, 6 Drawing Sheets

CHILD'S AUTOMOTIVE SAFETY BOOSTER SEAT WITH A VIEW

This patent application is a continuation-in-part of the parent patent application, Ser. No. 07/936,953, filed on Aug. 26, 1992, and now abandoned. Priority is herein claimed to all teachings and common subject matter of the parent application.

FIELD OF THE INVENTION

The present invention pertains to a child's automotive safety seat, and, more particularly, to a child booster safety seat that provides a good field of view, is comfortable and provides proper structural support.

BACKGROUND OF THE INVENTION

Children's automotive safety seats must meet many criteria and regulatory standards. However, it is not uncommon to find a safety seat providing good structural support while failing to provide measurable comfort to the child; this is because many of the safety design objectives often conflict with each other. For example, it is necessary to design the center of a seat with enough rigidity to provide proper support and withstand impact forces, while, at the same time, be compressible enough to offer softness and comfortableness.

In addition, most rigid safety seats that are designed similarly to this invention do not conform to all makes of automobiles. The backseats of automobile models are all different, i.e., the angle between the car seat base and the car seat backrest varies considerably from vehicle to vehicle. In order to avoid confusion, all references herein to parts of a seat pertain to the removable child booster safety seat, unless specifically identified as an automobile or car seat portion. Traditionally, rigid safety seats cannot conform to the various angles between the car seat base and the car seat backrest. Most rigidly designed seats, therefore, do not provide a stable support for the infant unless the angle of the child seat closely conforms to the angle between the car seat and the car seat backrest of the automobile.

These same differences in angle between car seat backrest and car seat base cause another problem for rigid seat designing. Rigid seats which do not closely conform to the car backseat angle require greater seatbelt extension, since the seat projects further away from the contour of the car backseat. This greater seatbelt extension is undesirable from a safety standpoint, since passenger safety is inversely proportional to the distance of a seatbelt from its anchor point.

The dichotomy entailed in meeting both safety and comfort criteria is also evident in the design of the child seat's side supports. The structure of the seat must have side mouldings for enveloping and supporting the occupant against lateral forces. Side supports, however, often prevent seatbelt straps from fitting snugly against the child occupant. In addition, highly prominent side supports obscure a child's view.

Many designs exist for child safety seats that are rigid, owing to the fact that very few are capable of fulfilling all of the design and safety objectives. Most of the seats represent compromises between conflicting objectives. In other words, structural differences are often adjusted to produce a tolerable solution; the importance of one criterion is reduced in order to bolster a seemingly antithetical criterion. This type of concession, however, does not effect excellent design.

The present invention is a child booster seat for an automobile that offers outstanding performance, despite the many conflicting design objectives.

The present invention meets the stringent Canadian standard of compressibility, which requires that the seat compress less than one inch under a force of five hundred pounds. Despite the rigidity and high density required to meet this strict standard, the child booster seat of this invention is also soft and comfortable. Conflicting safety design objectives are not compromised by the invention. The invention incorporates a central core of rigid, high-density foam to provide support. The rigid core is then overlaid with a thin layer of soft, compressible foam for comfort.

The rigid booster seat of this invention provides the best design features of both a flexible seat (as illustrated in U.S. Pat. No. 5,125,717) and a rigid seat (as shown in U.S. Pat. No. 4,726,086). One of the major drawbacks of rigid seats is that they cannot conform, as aforementioned, to the various angles of different automobiles. This is basically a problem of the child seat's stiffness. The rigid booster seat of U.S. Pat. No. 4,726,086 can provide a change in angle only by its back portion being hinged to its seat portion.

The present invention, however, allows the seat to bend about the intersection between the automobile's backrest and car seat base without the need for hinges. Normally, only hinged designs could provide such flexibility at this intersection point. However, this flexibility was never before possible with seat designs that were substantially rigid, such as this invention. The problem for the designer of this invention was how to provide, without a hinge, both rigidity and flexibility. This is no easy task. Adding flexibility to a rigid design is contrary to its original purpose, as is adding rigidity to a flexible design. Therefore, the current invention reflects an achievement not obvious to the skilled practitioners in this art. By adding rigid materials to the backrest, the invention maintains the rigidity required for the child seat. The invention, however, allows the backseat to bend with respect to its seat base by designing the intersection between the backseat and seat base with flexible foam. In this manner, the need for a mechanical hinge is negated. This one-piece design has many advantages, including an improved degree of safety and a lower manufacturing cost.

The current invention also features side supports that cushion against lateral forces and movement, while allowing a seatbelt to fit flush across the base of the seat. The side supports are also designed with a low profile, so that the child has a wide field of view. These side supports are rigid enough to provide support, but soft enough to give the feel of a flexible design.

Another dynamic of comfort is provided by this wide field of view. A child who can see is usually one who is less likely to wriggle or whine.

DISCUSSION OF RELATED ART

In European Patent Application No. 0 197 910 A2, issued to FLYBORG, a child booster seat is illustrated. The child seat provides the child with a limited, rear view. The seat is positioned backwards against the front car seat for support. A well is carved into the side supports for accommodating a lap seatbelt. However, the well does not lie flush with the bottom surface of the seat, so that the seatbelt will not lie flush therewith. Therefore, the belt will not provide a snug fit about a child occupant. Such a seat design may cause the occupant to "submarine" (i.e., slide out from under the belt) during a crash.

In United Kingdom Patent Application No. GB 2 154 131A, issued to SWIFT, a child vehicle seat is shown that will accommodate an automobile's lap seatbelt. The side sections of the child seat have a high profile, thus limiting the child's view. In addition, these high side projections require that the belt be held by a movable clip. The belts do not fit flush with the seat bottom surface; hence, again, the potential problem of submarining during impact exists.

U.S. Pat. No. Des. 266,044, issued to BLANCHARD on Sep. 7, 1982, for "Auxiliary Seat For a Child" illustrates a safety seat that accommodates a flush-fitting seatbelt. This is accomplished by placing side grooves in the base, eliminating side restraining members. The flush-fitting seatbelt design will prevent submarining. The absence of side members, however, does not provide the proper support for the child during turns of the car or during a side impact.

U.S. Pat. No. Des. 264,788, issued to BLANCHARD on Jun. 8, 1982, for "Auxiliary Seat For a Child", illustrates a safety seat that accommodates a flush-fitting seatbelt. This is accomplished by placing side grooves in the base, eliminating side restraining members along the seat bottom. The flush-fitting seatbelt design will prevent submarining. The absence of side members at the base, however, does not provide the full side support for the child during turns of the car or during a side impact.

In U.S. Pat. No. 4,726,086, issued to MC EVOY on Feb. 23, 1988, for a "Composite Foam Seat Cushion and Method of Preparation" a hinged booster seat is shown, having internal density foams to stiffen the soft outer foams. The intersection between the backrest and seat base is hinged in order to change the angle of the seat to conform to different automobile backseats.

In U.S. Pat. No. 5,125,717, issued to SKOLD et al on Jun. 30, 1992, for "Adjustable Booster Seat for Juvenile Auto Passengers" a child seat is illustrated having means for adjusting the angle of the seat by means of hinged, threaded socket members.

SUMMARY OF THE INVENTION

In accordance with the present invention, there is provided a child's automotive booster seat having enough rigidity to withstand high compression, and, simultaneously providing softness and comfort for the child occupant. Conflicting safety design objectives are accomplished by constructing the center of the booster seat from a rigid styrofoam, which is overlaid with a thin layer of soft urethane foam for comfort. Elongated fiberglass battens can be added together with the internal, rigid styrofoam of the backrest to provide further stiffening where so desired. The booster seat is designed to have low-profile side member supports along the back and base portions of the seat. The low-profile supports provide sufficient confinement for the child, while allowing a wide-angle view from the seat (which is also a source of comfort for both children and accompanying adults). A portion of the side member base supports is a cutaway section, revealing a well that lies flush with the bottom seat. In this manner, the car seatbelt can be snugly applied about the child to prevent submarining during a crash. Thereby, the invention (which provides a child with a full four inches of height) helps position the child so that the child can take full advantage of a shoulder belt that was designed for an adult. The child seat's intersection of the backrest and seat base comprises the aforementioned flexible urethane foam. This allows the seat to bend about the intersection of the child seat portions, thus further allowing the child seat to conform to different automobile backseat angles without the use of a hinge. This conformity lends a universality to the child seat. Such conformity has been achieved using a single-piece integrated construction, heretofore unachievable.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations throughout the FIGURES.

DESCRIPTION OF THE PREFERRED EMBODIMENT

Figure 1:
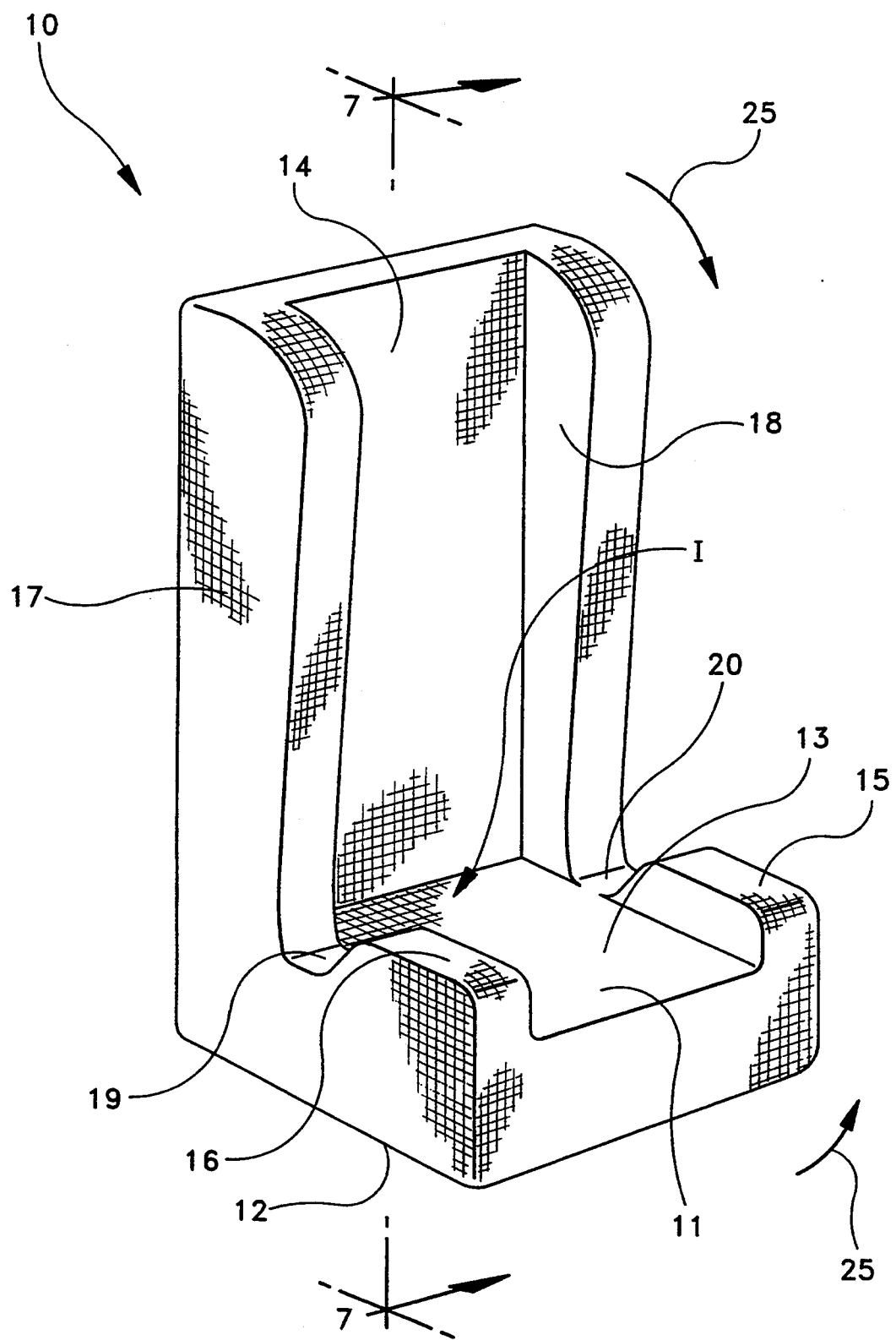
FIG. 1 is a perspective view of the child's automotive safety booster seat of this invention.
Figure 2:
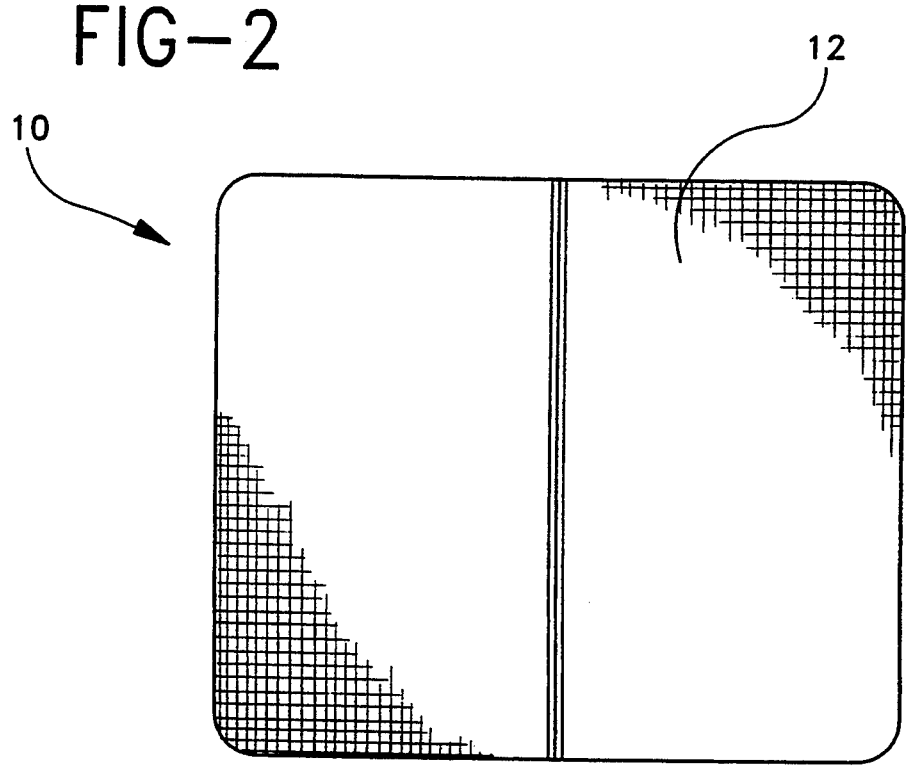
FIG. 2 is a bottom view of the child's automotive safety booster seat of the invention, illustrated in FIG. 1.
Figure 4:
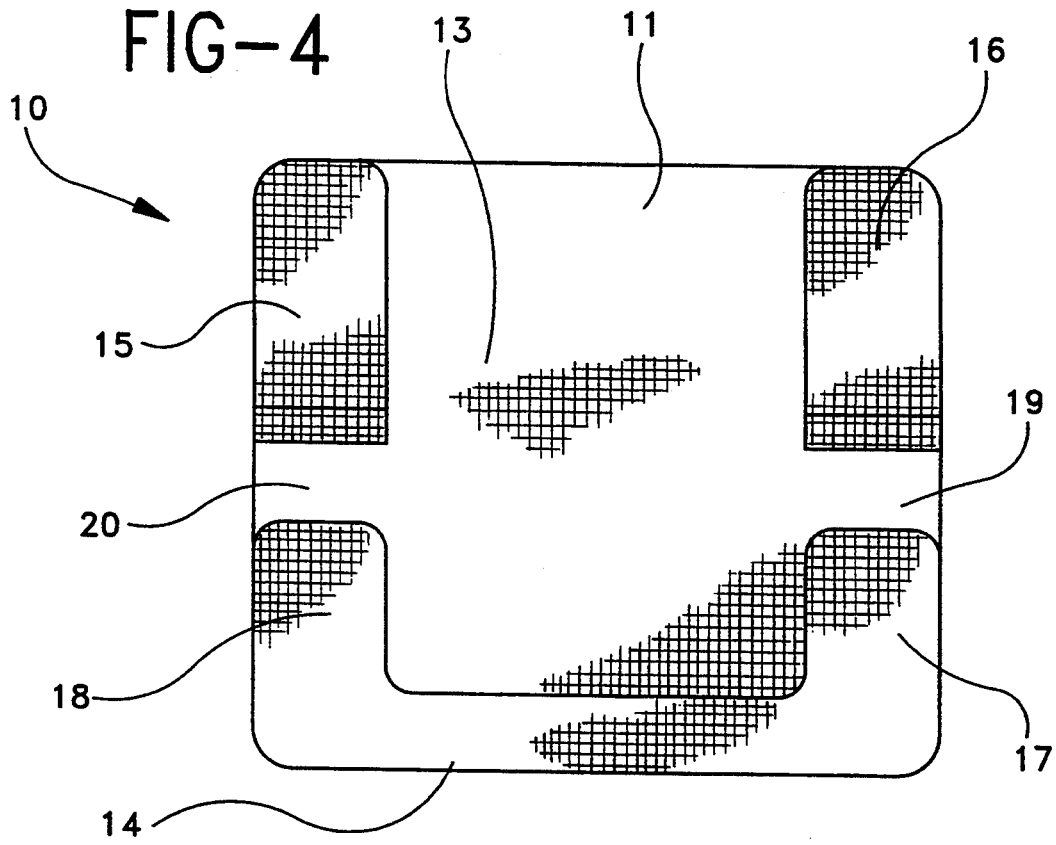
FIG. 4 is a top view of the child's automotive safety booster seat of the invention, as shown in FIG. 1.
Figure 3:
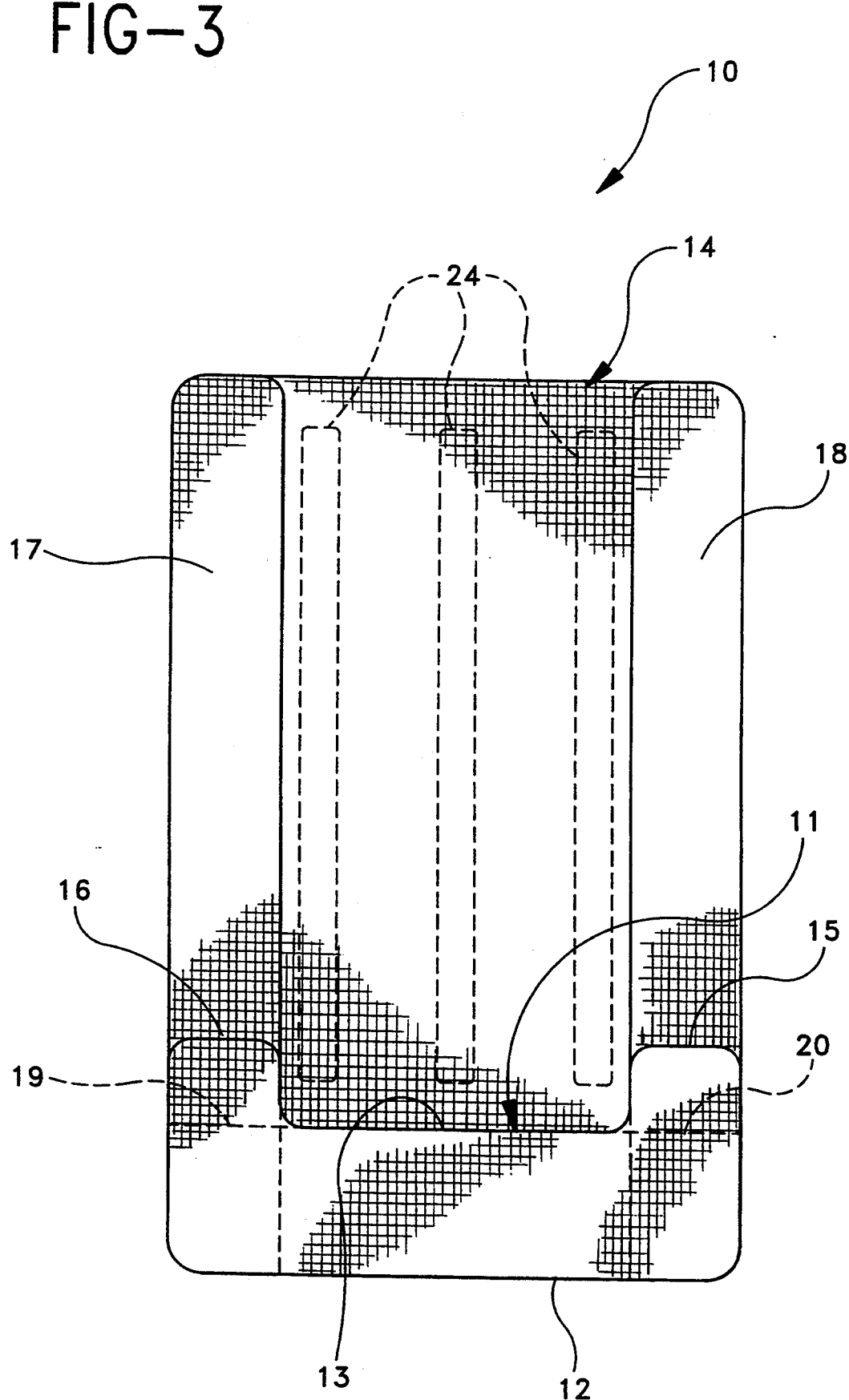
FIG. 3 is a front view of the child's automotive safety booster seat of this invention, as depicted in FIG. 1.

Generally speaking, the invention features a child's automotive booster seat that provides safety without restricting the child's view. The safety booster seat also meets rigorous Compression standards, while simultaneously providing softness and comfort. The child seat provides a universality in conforming to different car seat angles, by virtue of its compressibility about the intersection of the backrest and seat base. This compressibility of the intersection allows for the elimination of unyielding, hardware hinges and other mechanical adjustments, thus providing a safer and less costly child seat.

Now referring to FIGS. 1 through 7, a child booster seat 10 is illustrated. The booster seat 10 comprises a seat portion 11 having an internal core 22 (FIG. 7) comprising a high-density polystyrene foam (styrofoam). The top 13 of the seat portion 11 is overlaid with a thin layer (about one-half-inch) of soft, compressible, blue polyurethane foam 24. The blue polyurethane foam 24 has an approximate density that is greater than the polystyrene foam of the seat core 22. The bottom 12 of the seat portion 11 is overlaid with about one-quarter of an inch of blue polyurethane foam 26. The upper back piece 14 also comprises the blue polyurethane foam. The respective upper and lower side supports 15, 16, 17 and 18 are comprised of a beige polyurethane foam of a lower density of than the polystyrene foam core 22.

Figure 5:
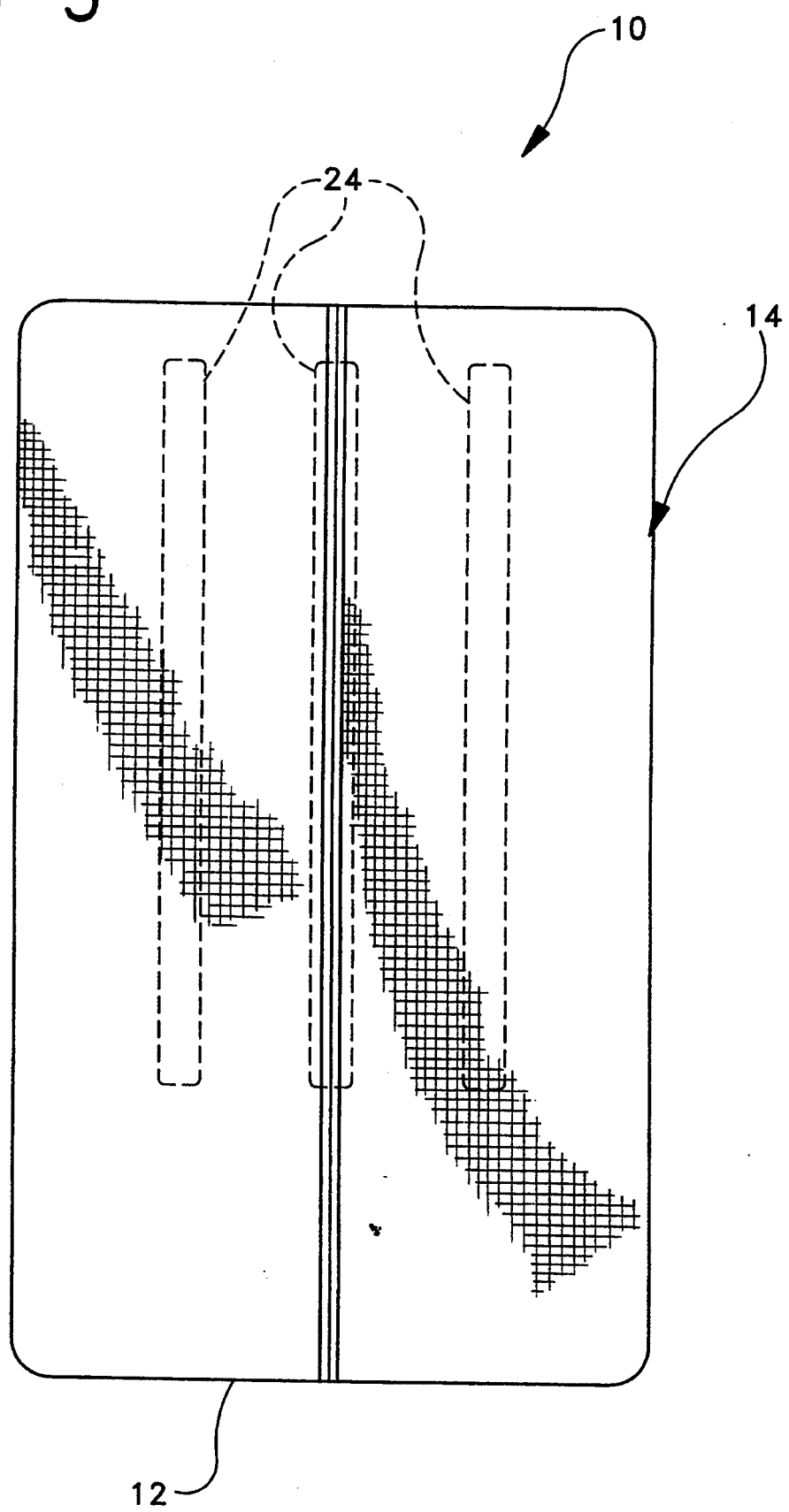
FIG. 5 is a back view of the child's automotive safety booster seat of this invention, as illustrated in FIG. 1.

The rigid core with soft, outer, compressible foam provides the seat with needed rigidity, while also providing comfort and softness for a child occupant. Where added rigidity is required, thin strips 28 of fiberglass batten can be incorporated into the upper back piece 14, as illustrated in FIG. 5.

The side supports 15, 16, 17 and 18 respectively provide constraint against lateral movement during automotive maneuvers or side impacts. These side supports are generally of such low profile that the forward and side views of the child are unobstructed. In other words, a forward, wide-angle view is provided, despite the purpose of the forward and side supports being to provide confinement and/or constraint.

Cut-out portions or wells 19 and 20 are disposed, respectively, between the lower and upper side supports 16 and 17, and the lower and upper side supports 15 and 18. These respective wells 19 and 20 are flush with the top seat surface 13 of seat portion 11. This allows the lap seatbelt of the automobile to be tightened in order to provide a snug fit against a child occupant without the possibility of the child submarining.

Figure 6:
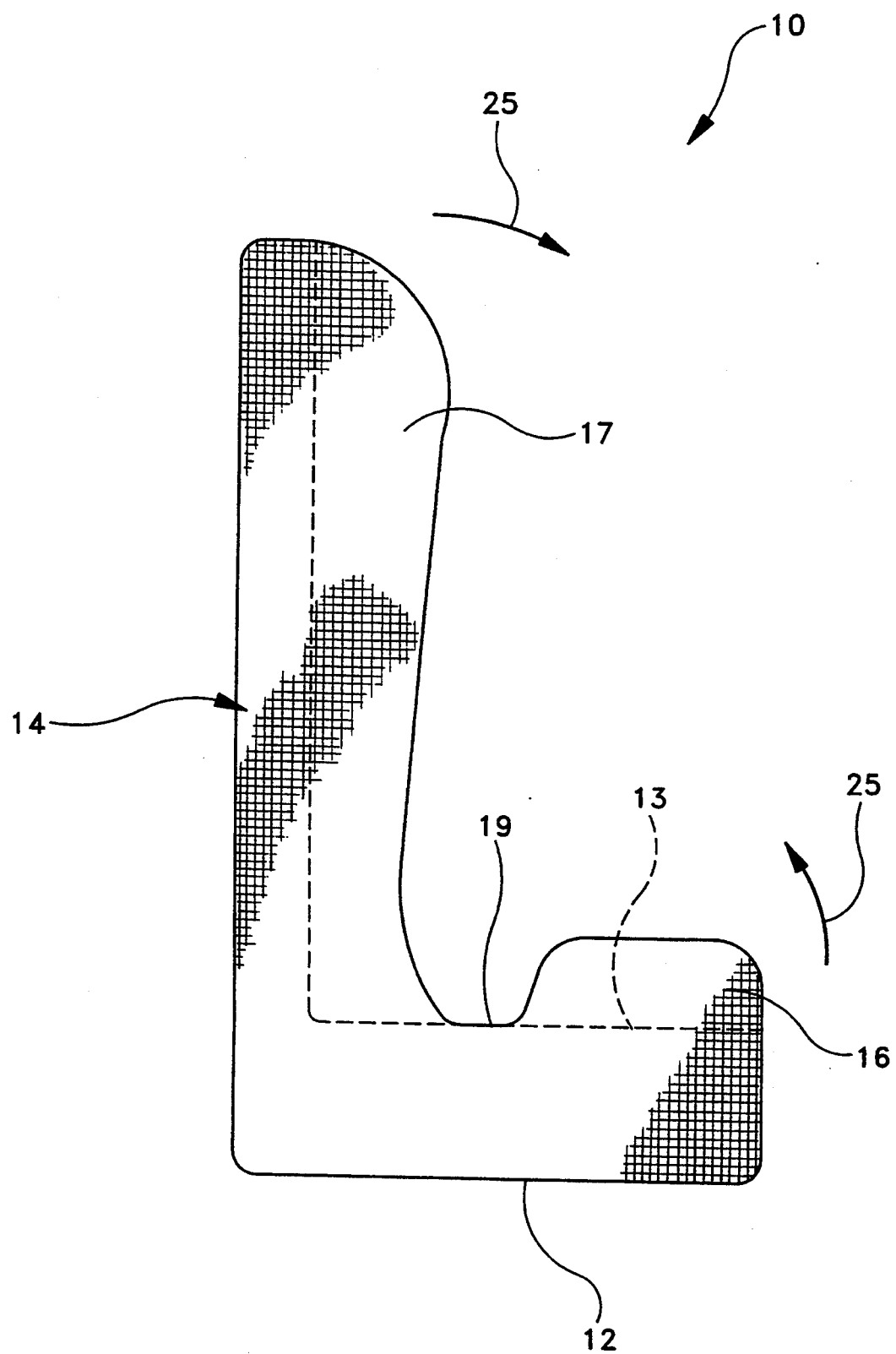
FIG. 6 is a side view of the child's automotive safety booster seat of the invention, as shown in FIG. 1.
Figure 7:
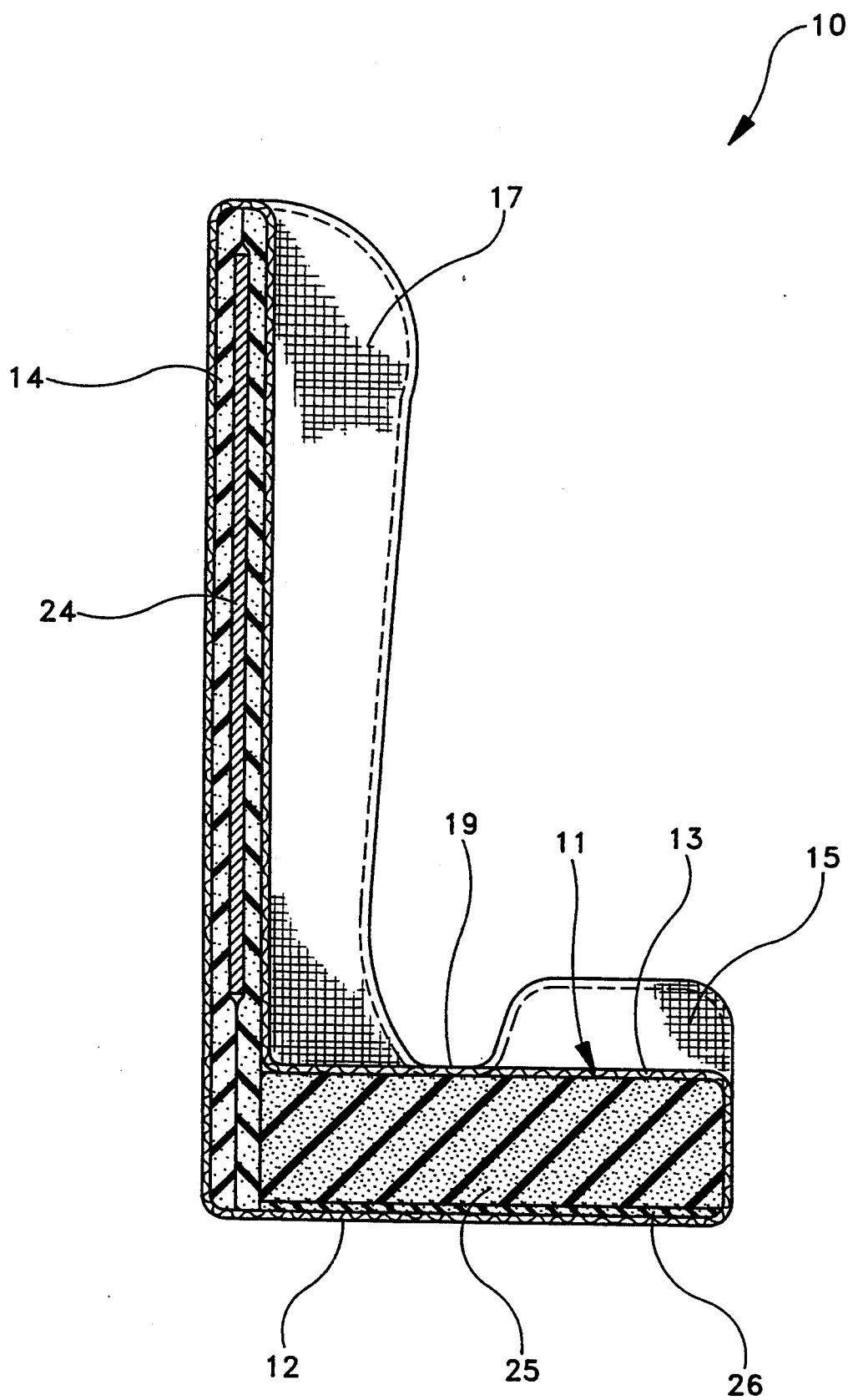
FIG. 7 is a cross-sectional view of the child's automotive safety booster seat, along lines 7—7 of FIG. 1.

The child seat of this invention can conform to all angles between the car backrest and car seat portion. This is accomplished without the use of hinges or other mechanical adjustments commonly found in child seats of this kind. This is particularly true for those child seats having a rigid construction. This conformity provides a certain universality achieved in the current invention. The conformity is achieved by making the intersection "I" between the upper back portion 14 and the seat portion 11 flexible, as illustrated in FIGS. 1 and 6. This allows the stiffening to be achieved solely by internal styrofoam and battens, without impeding the ability of the outer foam materials to flex and provide the bendable intersection joint "I". The intersection "I" allows the upper back portion 14 to bend with respect to the seat portion 11, as shown by arrows 25.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A child's automotive booster seat providing safety and comfort to a child occupant, as well as having universality to conform to different angles of automobile backseats, said child's automotive booster seat comprising a seat portion and a back portion of integral construction forming a unitary structure, means defining a flexible foam intersection between said seat portion and said back portion, allowing said back portion to bend with respect to said seat portion in order to accommodate different angles of said automobile backseats, said seat portion having a substantially rigid core member overlaid with a soft, compressible foam layer, a plurality of upper and lower side supports providing confinement and constraint to said child occupant, and means defining a pair of wells disposed between said upper and lower side supports, said wells being substantially flush with a surface of said seat portion, whereby an automotive lap seatbelt can be fitted snugly about said child occupant to prevent submarining during an impact or crash.

2. The child's automotive booster seat of claim wherein said rigid core member comprises a polystyrene foam.

3. The child's automotive booster seat of claim 1, wherein said soft, compressible foam layer comprises a polyurethane foam.

4. The child's automotive booster seat of claim 1, wherein said upper and lower side supports comprise polyurethane foam.

5. The child's automotive booster seat of claim 1, wherein said back portion contains at least one rigid member for added stiffness.

6. A child's automotive booster seat providing safety and comfort to a child occupant, said child's automotive booster seat comprising a seat portion and a back portion of integral construction forming a unitary structure, said seat portion having a substantially rigid core member comprising a polystyrene foam overlaid with a soft, compressible polyurethane foam layer, a plurality of upper and lower side supports providing confinement and constraint to said child occupant, and means defining a pair of wells disposed between said upper and lower side supports, said wells being substantially flush with a surface of said seat portion, whereby an automotive lap seatbelt can be fitted snugly about said child occupant to prevent submarining during an impact or crash, an intersection of said back portion and said seat portion defining a flexible foam demarcation allowing said back portion to bend with respect to said seat portion, whereby said child's booster seat can conform to different backseat angles presented by various automobiles.

7. The child's automotive booster seat of claim 6, wherein said upper and lower side supports comprise polyurethane foam.

* * * * *